US010015705B2

(12) United States Patent
Xu et al.

(10) Patent No.: US 10,015,705 B2
(45) Date of Patent: Jul. 3, 2018

(54) DEVICE AND METHOD IN RADIO COMMUNICATION SYSTEM

(71) Applicant: SONY CORPORATION, Tokyo (JP)

(72) Inventors: Xiaodong Xu, Beijing (CN); Yateng Hong, Beijing (CN); Ya Liu, Beijing (CN); Chengjin Luo, Beijing (CN)

(73) Assignee: Sony Corporation, Tokyo (JP)

( * ) Notice: Subject to any disclaimer, the term of this patent is extended or adjusted under 35 U.S.C. 154(b) by 214 days.

(21) Appl. No.: 14/760,881

(22) PCT Filed: Dec. 26, 2013

(86) PCT No.: PCT/CN2013/090534
§ 371 (c)(1),
(2) Date: Jul. 14, 2015

(87) PCT Pub. No.: WO2014/114165
PCT Pub. Date: Jul. 31, 2014

(65) Prior Publication Data
US 2015/0350977 A1 Dec. 3, 2015

(30) Foreign Application Priority Data
Jan. 25, 2013 (CN) .......................... 2013 1 0029737

(51) Int. Cl.
*H04W 36/00* (2009.01)
*H04W 72/04* (2009.01)
*H04W 24/10* (2009.01)

(52) U.S. Cl.
CPC ....... *H04W 36/0088* (2013.01); *H04W 24/10* (2013.01); *H04W 72/0413* (2013.01)

(58) Field of Classification Search
CPC . H04W 36/38; H04W 36/0088; H04W 24/10; H04W 72/0413
See application file for complete search history.

(56) References Cited

U.S. PATENT DOCUMENTS

| 2009/0059871 A1 | 3/2009 | Nader et al. | |
| 2012/0094672 A1* | 4/2012 | Hunukumbure | H04W 24/08 455/436 |
| 2013/0210435 A1* | 8/2013 | Dimou | H04W 36/0083 455/436 |

FOREIGN PATENT DOCUMENTS

| CN | 101631346 | 1/2010 |
| CN | 101843142 | 9/2010 |

(Continued)

OTHER PUBLICATIONS

International Search Report dated Apr. 3, 2014 in PCT/CN2013/090534 Filed Dec. 26, 2013.

*Primary Examiner* — Ian N Moore
*Assistant Examiner* — Ronald H Davis
(74) *Attorney, Agent, or Firm* — Oblon, McClelland, Maier & Neustadt, L.L.P.

(57) ABSTRACT

A device and method in a radio communication system. The device includes: an acquisition unit for use in acquiring a signal quality of a mobile terminal relative to a source cell; an assessment unit for use in assessing the degree of change in the signal quality of the mobile terminal relative to the source cell on the basis of multiple signal qualities of the mobile terminal relative to the source cell acquired at every predetermined time interval; and, a triggering unit for use in triggering, on the basis of the degree of change in the signal quality of the mobile terminal relative to the source cell, the mobile terminal to submit a measurement result.

19 Claims, 7 Drawing Sheets

(56) References Cited

FOREIGN PATENT DOCUMENTS

| CN | 102223667 | 10/2011 |
|----|-----------|---------|
| CN | 102625378 | 8/2012  |
| CN | 102869053 | 1/2013  |

* cited by examiner

DEVICE AND METHOD IN RADIO COMMUNICATION SYSTEM

TECHNICAL FIELD

The invention relates generally to the field of wireless communications, and more particularly to a device and method in Long Term Evolution (LTE) and its subsequent evolution (LTE-A) of a Universal Mobile Telecommunications System (UMTS).

BACKGROUND ART

The concept of Heterogeneous Networks was proposed earliest in 3GPP Rel-10. The Heterogeneous Networks realize a closer distance from a mobile terminal of a user by introducing a low-power access point into a macro cell, so as to improve a service quality of the user, thereby improving a capacity of the overall networks. Hence, in the Heterogeneous Networks, a macro cell will mainly provide network coverage, and a low-power access point located in a hot region will mainly provide high-rate and high-quality service bearing.

However, the Heterogeneous Networks also bring about many problems. For example, switching efficiency of switching a mobile terminal from a source cell to a target cell is influenced greatly, and a probability of failure of switching of the mobile terminal is also increased. At present, various techniques have been adopted to improve switching efficiency of switching a mobile terminal from a source cell to a target cell and reduce a probability of failure of switching of the mobile terminal; however, this generally will cause a higher probability of ping-pong switching of the mobile terminal.

It is therefore desired to provide a device and method in a wireless communication system, so as to improve a probability of success of switching a mobile terminal from a source cell to a target cell and meanwhile also to reduce a probability of ping-pong switching of the mobile terminal, thereby providing a user with seamless and stable network coverage.

SUMMARY OF THE INVENTION

According to one embodiment of the invention, there is provided a device in a wireless communication system, comprising: an obtaining unit for obtaining a signal quality of a mobile terminal with respect to a source cell; an evaluating unit for evaluating, according to a plurality of signal qualities of the mobile terminal with respect to the source cell which are obtained every predetermined period of time, a variation degree of the signal quality of the mobile terminal with respect to the source cell; and a triggering unit for triggering the mobile terminal, according to the variation degree of the signal quality of the mobile terminal with respect to the source cell, to report a measurement result.

According to the device, wherein, the obtaining unit is further adapted to judge, according to the signal quality of the mobile terminal with respect to the source cell, whether a signal quality of the mobile terminal with respect to a target cell is obtained; and the evaluating unit is further adapted to evaluate a variation degree of signal qualities of the mobile terminal with respect to the source cell and the target cell, according to a plurality of signal qualities of the mobile terminal with respect to the source cell and the target cell which are obtained every predetermined period of time.

According to the device, wherein, the predetermined period of time is pre-set or is determined according to a reporting and evaluation period of the measurement result of the mobile terminal.

According to the device, wherein, the evaluating unit is further adapted to determine an offset of the variations of the signal qualities of the mobile terminal with respect to the source cell and the target cell according to configuration parameters of the source cell, calculate a signal quality difference between the signal qualities of the mobile terminal with respect to the source cell and the target cell, and use a difference between the signal quality difference and the offset as a judgment threshold value for evaluating the variation degree of the signal qualities of the mobile terminal with respect to the source cell and the target cell.

According to the device, wherein, the evaluating unit is further adapted to compare a signal quality difference between current signal qualities of the mobile terminal with respect to the source cell and the target cell with the judgment threshold value determined at a previous time, update, according to a comparison result, an indicator for indicating the variation degree of the signal qualities of the mobile terminal with respect to the source cell and the target cell, and trigger the mobile terminal to report the measurement result when a value of the indicator exceeds a predetermined threshold value.

According to the device, wherein, the evaluating unit is further adapted to increase the value of the indicator, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is greater than or equal to the judgment threshold value determined at the previous time.

According to the device, wherein, the evaluating unit is further adapted to reduce the value of the indicator or keep the value of the indicator unchanged, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is less than the judgment threshold value determined at the previous time.

According to the device, wherein, the evaluating unit is further adapted to reset the indicator or reduce the value of the indicator by a predetermined value in the case that the value of the indicator does not vary within a predetermined period.

According to the device, wherein, the evaluating unit is further adapted to compare the value of the indicator with a predetermined upper limit value of the indicator, and not to increase the value of the indicator any longer when the value of the indicator reaches the upper limit value of the indicator, wherein the upper limit value of the indicator is greater than or equal to the predetermined threshold value.

According to the device, wherein, the evaluating unit is further adapted to make the mobile terminal stop reporting the measurement result when the value of the indicator is lower than the predetermined threshold value.

According to the device, wherein, the evaluating unit is further adapted to update the judgment threshold value each time a signal quality difference between the signal qualities of the mobile terminal with respect to the source cell and the target cell is calculated.

According to the device, wherein, the evaluating unit is further adapted to pre-set a minimum judgment threshold value; and when updating the judgment threshold value, set the minimum judgment threshold value as the updated judgment threshold value if the calculated judgment threshold value is less than the minimum judgment threshold value.

According to the device, wherein, the triggering unit is further adapted to trigger the mobile terminal to report the measurement result, if it is detected that there are consecutive predetermined number of measurement results less than the minimum judgment threshold value, after the minimum judgment threshold value is set as the updated judgment threshold value.

According to the device, wherein, the triggering unit is further adapted to trigger the mobile terminal to report the measurement result, if it is detected that there are more than a predetermined number of measurement results less than the minimum judgment threshold value within the predetermined period of time, after the minimum judgment threshold value is set as the updated judgment threshold value.

According to another embodiment of the invention, there is provided a method for use in a wireless communication system, comprising: an obtaining step of obtaining a signal quality of a mobile terminal with respect to a source cell; an evaluating step of evaluating, according to a plurality of signal qualities of the mobile terminal with respect to the source cell which are obtained every predetermined period of time, a variation degree of the signal quality of the mobile terminal with respect to the source cell; and a triggering step of triggering the mobile terminal, according to the variation degree of the signal quality of the mobile terminal with respect to the source cell, to report a measurement result.

According to the method, wherein, in the obtaining step, it is further judged, according to the signal quality of the mobile terminal with respect to the source cell, whether a signal quality of the mobile terminal with respect to a target cell is obtained; and in the evaluating step, a variation degree of signal qualities of the mobile terminal with respect to the source cell and the target cell are further evaluated according to a plurality of signal qualities of the mobile terminal with respect to the source cell and the target cell which are obtained every predetermined period of time.

According to the method, wherein, the predetermined period of time is pre-set or is determined according to a reporting and evaluation period of the measurement result of the mobile terminal.

According to the method, wherein, in the evaluating step, an offset of the variations of the signal qualities of the mobile terminal with respect to the source cell and the target cell is further determined according to configuration parameters of the source cell, a signal quality difference between the signal qualities of the mobile terminal with respect to the source cell and the target cell is calculated, and a difference between the signal quality difference and the offset is used as a judgment threshold value for evaluating the variation degree of the signal qualities of the mobile terminal with respect to the source cell and the target cell.

According to the method, wherein, in the evaluating step, a signal quality difference between current signal qualities of the mobile terminal with respect to the source cell and the target cell is further compared with the judgment threshold value determined at a previous time, an indicator for indicating the variation degree of the signal qualities of the mobile terminal with respect to the source cell and the target cell is updated according to a comparison result, and the mobile terminal is triggered to report the measurement result when a value of the indicator exceeds a predetermined threshold value.

According to the method, wherein, in the evaluating step, the value of the indicator is further increased, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is greater than or equal to the judgment threshold value determined at the previous time.

According to the method, wherein, in the evaluating step, the value of the indicator is further reduced or the value of the indicator is further kept unchanged, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is less than the judgment threshold value determined at the previous time.

According to the method, wherein, in the evaluating step, the indicator is further reset or the value of the indicator is further reduced by a predetermined value in the case that the value of the indicator does not vary within a predetermined period.

According to the method, wherein, in the evaluating step, the value of the indicator is further compared with a predetermined upper limit value of the indicator, and the value of the indicator is not increased any longer when the value of the indicator reaches the upper limit value of the indicator, wherein the upper limit value of the indicator is greater than or equal to the predetermined threshold value.

According to the method, wherein, in the evaluating step, the mobile terminal is further made to stop reporting the measurement result when the value of the indicator is lower than the predetermined threshold value.

According to the method, wherein, in the evaluating step, the judgment threshold value is further updated each time a signal quality difference between the signal qualities of the mobile terminal with respect to the source cell and the target cell is calculated.

According to the method, wherein, in the evaluating step, a minimum judgment threshold value is further pre-set; and when updating the judgment threshold value, the minimum judgment threshold value is set as the updated judgment threshold value if the calculated judgment threshold value is less than the minimum judgment threshold value.

According to the method, wherein, in the triggering step, the mobile terminal is further triggered to report the measurement result, if it is detected that there are consecutive predetermined number of measurement results less than the minimum judgment threshold value, after the minimum judgment threshold value is set as the updated judgment threshold value.

According to the method, wherein, in the triggering step, the mobile terminal is further triggered to report the measurement result, if it is detected that there are more than a predetermined number of measurement results less than the minimum judgment threshold value within the predetermined period of time, after the minimum judgment threshold value is set as the updated judgment threshold value.

According to another embodiment of the invention, there is provided a device in a wireless communication system, comprising: a receiving unit for receiving an uplink reference signal transmitted by a mobile terminal; an obtaining unit for obtaining a signal quality of the mobile terminal with respect to a source cell according to the uplink reference signal; an evaluating unit for evaluating, according to a plurality of signal qualities of the mobile terminal with respect to the source cell which are obtained every predetermined period of time, a variation degree of the signal quality of the mobile terminal with respect to the source cell; and a transmitting unit for transmitting, according to the variation degree of the signal quality of the mobile terminal with respect to the source cell, an instruction for triggering the mobile terminal to report a measurement result, to the mobile terminal.

According to the device, wherein, the obtaining unit is further adapted to set a signal quality of the mobile terminal with respect to a target cell as a predetermined reference value; and the evaluating unit is further adapted to evaluate, according to the plurality of signal qualities of the mobile terminal with respect to the source cell which are obtained every predetermined period of time and the predetermined reference value, a variation degree of signal qualities of the mobile terminal with respect to the source cell and the target cell.

According to the device, wherein, the predetermined period of time is pre-set or is determined according to a reporting and evaluation period of the measurement result of the mobile terminal.

According to the device, wherein, the evaluating unit is further adapted to determine an offset of the variations of the signal qualities of the mobile terminal with respect to the source cell and the target cell according to configuration parameters of the source cell, calculate a signal quality difference between the signal quality of the mobile terminal with respect to the source cell and the predetermined reference value, and use a difference between the signal quality difference and the offset as a judgment threshold value for evaluating the variation degree of the signal qualities of the mobile terminal with respect to the source cell and the target cell.

According to the device, wherein, the evaluating unit is further adapted to compare a signal quality difference between a current signal quality of the mobile terminal with respect to the source cell and the predetermined reference value, with a judgment threshold value determined at a previous time, update, according to a comparison result, an indicator for indicating the variation degree of the signal qualities of the mobile terminal with respect to the source cell and the target cell, and trigger the mobile terminal to report the measurement result when a value of the indicator exceeds a predetermined threshold value.

According to the device, wherein, the evaluating unit is further adapted to increase the value of the indicator, according to a variation amount of the signal quality difference between the current signal quality of the mobile terminal with respect to the source cell and the predetermined reference value and a signal quality difference between a previous time of signal quality of the mobile terminal with respect to the source cell and the predetermined reference value, in the case that the signal quality difference between the current signal quality of the mobile terminal with respect to the source cell and the predetermined reference value is greater than or equal to the judgment threshold value determined at the previous time.

According to the device, wherein, the evaluating unit is further adapted to reduce the value of the indicator or keep the value of the indicator unchanged, according to a variation amount of the signal quality difference between the current signal quality of the mobile terminal with respect to the source cell and the predetermined reference value and a signal quality difference between a previous time of signal quality of the mobile terminal with respect to the source cell and the predetermined reference value, in the case that the signal quality difference between the current signal quality of the mobile terminal with respect to the source cell and the predetermined reference value is less than the judgment threshold value determined at the previous time.

According to the device, wherein, the evaluating unit is further adapted to reset the indicator or reduce the value of the indicator by a predetermined value in the case that the value of the indicator does not vary within a predetermined period.

According to the device, wherein, the evaluating unit is further adapted to compare the value of the indicator with a predetermined upper limit value of the indicator, and not to increase the value of the indicator any longer when the value of the indicator reaches the upper limit value of the indicator, wherein the upper limit value of the indicator is greater than or equal to the predetermined threshold value.

According to the device, wherein, the evaluating unit is further adapted to make the mobile terminal stop reporting the measurement result when the value of the indicator is lower than the predetermined threshold value.

According to the device, wherein, the evaluating unit is further adapted to update the judgment threshold value each time a signal quality difference between the signal quality of the mobile terminal with respect to the source cell and the predetermined reference value is calculated.

According to the device, wherein, the evaluating unit is further adapted to pre-set a minimum judgment threshold value; and when updating the judgment threshold value, set the minimum judgment threshold value as the updated judgment threshold value if the calculated judgment threshold value is less than the minimum judgment threshold value.

According to the device, wherein, the triggering unit is further adapted to trigger the mobile terminal to report the measurement result, if it is detected that there are consecutive predetermined number of measurement results less than the minimum judgment threshold value, after the minimum judgment threshold value is set as the updated judgment threshold value.

According to the device, wherein, the triggering unit is further adapted to trigger the mobile terminal to report the measurement result, if it is detected that there are more than a predetermined number of measurement results less than the minimum judgment threshold value within the predetermined period of time, after the minimum judgment threshold value is set as the updated judgment threshold value.

According to another embodiment of the invention, there is provided a method for use in a wireless communication system, comprising: a receiving step of receiving an uplink reference signal transmitted by a mobile terminal; an obtaining step of obtaining a signal quality of the mobile terminal with respect to a source cell according to the uplink reference signal; an evaluating step of evaluating, according to a plurality of signal qualities of the mobile terminal with respect to the source cell which are obtained every predetermined period of time, a variation degree of the signal quality of the mobile terminal with respect to the source cell; and a transmitting step of transmitting, according to the variation degree of the signal quality of the mobile terminal with respect to the source cell, an instruction for triggering the mobile terminal to report a measurement result, to the mobile terminal.

According to the method, wherein, in the obtaining step, a signal quality of the mobile terminal with respect to a target cell is further set as a predetermined reference value; and in the evaluating step, a variation degree of signal qualities of the mobile terminal with respect to the source cell and the target cell are further evaluated according to the plurality of signal qualities of the mobile terminal with respect to the source cell which are obtained every predetermined period of time and the predetermined reference value.

According to the method, wherein, the predetermined period of time is pre-set or is determined according to a reporting and evaluation period of the measurement result of the mobile terminal.

According to the method, wherein, in the evaluating step, an offset of the variations of the signal qualities of the mobile terminal with respect to the source cell and the target cell is further determined according to configuration parameters of the source cell, a signal quality difference between the signal quality of the mobile terminal with respect to the source cell and the predetermined reference value is calculated, and a difference between the signal quality difference and the offset is used as a judgment threshold value for evaluating the variation degree of the signal qualities of the mobile terminal with respect to the source cell and the target cell.

According to the method, wherein, in the evaluating step, a signal quality difference between a current signal quality of the mobile terminal with respect to the source cell and the predetermined reference value is further compared with a judgment threshold value determined at a previous time, an indicator for indicating the variation degree of the signal qualities of the mobile terminal with respect to the source cell and the target cell is updated according to a comparison result, and the mobile terminal is triggered to report the measurement result when a value of the indicator exceeds a predetermined threshold value.

According to the method, wherein, in the evaluating step, the value of the indicator is further increased, according to a variation amount of the signal quality difference between the current signal quality of the mobile terminal with respect to the source cell and the predetermined reference value and a signal quality difference between a previous time of signal quality of the mobile terminal with respect to the source cell and the predetermined reference value, in the case that the signal quality difference between the current signal quality of the mobile terminal with respect to the source cell and the predetermined reference value is greater than or equal to the judgment threshold value determined at the previous time.

According to the method, wherein, in the evaluating step, the value of the indicator is further reduced or the value of the indicator is further kept unchanged, according to a variation amount of the signal quality difference between the current signal quality of the mobile terminal with respect to the source cell and the predetermined reference value and a signal quality difference between a previous time of signal quality of the mobile terminal with respect to the source cell and the predetermined reference value, in the case that the signal quality difference between the current signal quality of the mobile terminal with respect to the source cell and the predetermined reference value is less than the judgment threshold value determined at the previous time.

According to the method, wherein, in the evaluating step, the indicator is further reset or the value of the indicator is further reduced by a predetermined value in the case that the value of the indicator does not vary within a predetermined period.

According to the method, wherein, in the evaluating step, the value of the indicator is further compared with a predetermined upper limit value of the indicator, and the value of the indicator is not increased any longer when the value of the indicator reaches the upper limit value of the indicator, wherein the upper limit value of the indicator is greater than or equal to the predetermined threshold value.

According to the method, wherein, in the evaluating step, the mobile terminal is further made to stop reporting the measurement result when the value of the indicator is lower than the predetermined threshold value.

According to the method, wherein, in the evaluating step, the judgment threshold value is further updated each time a signal quality difference between the signal quality of the mobile terminal with respect to the source cell and the predetermined reference value is calculated.

According to the method, wherein, in the evaluating step, a minimum judgment threshold value is further pre-set; and when updating the judgment threshold value, the minimum judgment threshold value is set as the updated judgment threshold value if the calculated judgment threshold value is less than the minimum judgment threshold value.

According to the method, wherein, in the triggering step, the mobile terminal is further triggered to report the measurement result, if it is detected that there are consecutive predetermined number of measurement results less than the minimum judgment threshold value, after the minimum judgment threshold value is set as the updated judgment threshold value.

According to the method, wherein, in the triggering step, the mobile terminal is further triggered to report the measurement result, if it is detected that there are more than a predetermined number of measurement results less than the minimum judgment threshold value within the predetermined period of time, after the minimum judgment threshold value is set as the updated judgment threshold value.

According to another embodiment of the invention, there is provided a computer storage medium including computer readable instructions, the computer instructions used for causing a computer to implement: an obtaining step of obtaining a signal quality of a mobile terminal with respect to a source cell; an evaluating step of evaluating, according to a plurality of signal qualities of the mobile terminal with respect to the source cell which are obtained every predetermined period of time, a variation degree of the signal quality of the mobile terminal with respect to the source cell; and a triggering step of triggering the mobile terminal, according to the variation degree of the signal quality of the mobile terminal with respect to the source cell, to report a measurement result.

According to another embodiment of the invention, there is provided a computer storage medium including computer readable instructions, the computer instructions used for causing a computer to implement: a receiving step of receiving an uplink reference signal transmitted by a mobile terminal; an obtaining step of obtaining a signal quality of the mobile terminal with respect to a source cell according to the uplink reference signal; an evaluating step of evaluating, according to a plurality of signal qualities of the mobile terminal with respect to the source cell which are obtained every predetermined period of time, a variation degree of the signal quality of the mobile terminal with respect to the source cell; and a transmitting step of transmitting, according to the variation degree of the signal quality of the mobile terminal with respect to the source cell, an instruction for triggering the mobile terminal to report a measurement result, to the mobile terminal.

By adopting the invention, it is made possible to trigger a mobile terminal to report a measurement result according to a variation degree of a signal quality of the mobile terminal with respect to a source cell or a target cell, without necessity of waiting for Time to Trigger. Due to the absence of Time to Trigger, when the mobile terminal is switched from the source cell to the target cell, residence time of the mobile terminal in a state 2 from detection of satisfaction of a switching event entry condition to reception of a switching indication and disconnection from the source cell is shortened greatly, thereby improving a probability of success of switching the mobile terminal from the source cell to the target cell. In addition, since the invention is not directed to improving a probability of success of switching the mobile terminal by lowering a switching event entry condition, it can also avoid the problem of ping-pong switching of the mobile terminal which is caused by lowering a switching event entry condition. Hence, by adopting the invention, it is made possible to improve a probability of success of switching the mobile terminal while avoiding ping-pong switching of the mobile terminal, thereby providing a user with seamless and stable network coverage.

BRIEF DESCRIPTION OF THE DRAWINGS

The foregoing and other objects, features and advantages of the invention will be understood more easily with reference to the following descriptions of the embodiments of the present invention combined with the appended drawings. In the appended drawings, identical or corresponding technical features or components will be denoted by identical or corresponding reference signs.

DETAILED DESCRIPTION OF THE EMBODIMENTS

Hereinafter, the embodiments of the invention will be described with reference to the appended drawings. It should be noted that, for the sake of clarity, representations and descriptions of components and processing known to those ordinarily skilled in the art which are irrelevant to the invention are omitted in the appended drawings and the descriptions.

Figure 1:
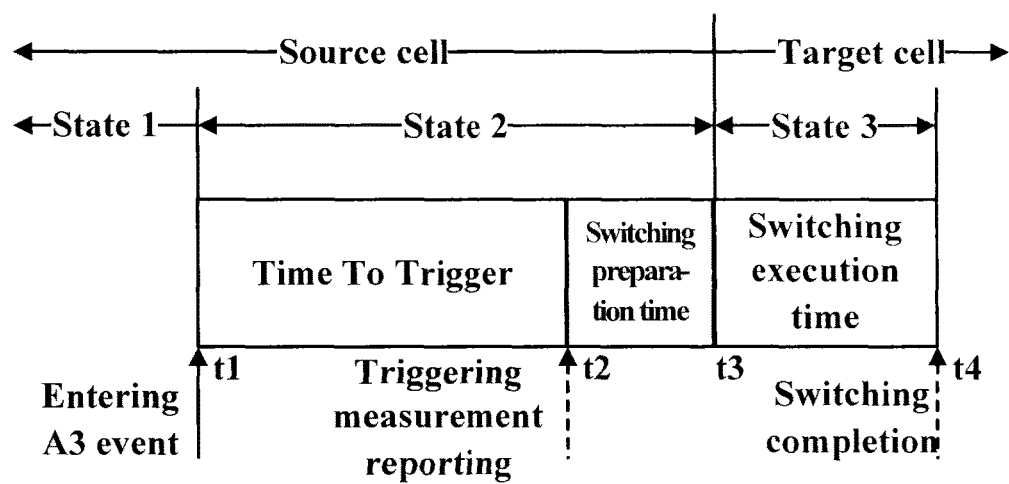
FIG. 1 is a schematic view illustrating a switching process of switching a mobile terminal from a source cell to a target cell.

Hereinafter, a switching process of switching a mobile terminal from a source cell to a target cell will be described combined with FIG. 1. FIG. 1 is a schematic view illustrating a switching process of switching a mobile terminal from a source cell to a target cell.

Prior to time t1, the mobile terminal is in a state 1, and for example detects whether a condition of entering an event A3 is satisfied. At time t1, the mobile terminal for example detects that the condition of entering the event A3 is satisfied. As should be understood by those skilled in the art, the mobile terminal only exemplarily detects whether the condition of entering the event A3 is satisfied, and can also detect whether conditions of entering other events are satisfied, for example can detect whether a condition of entering an event A5 and the like are satisfied.

Starting from time t1, the mobile terminal is in a state 2, and detects in pre-set Time To Trigger TTT (corresponding to the period of time from time t1 to time t2 as shown in FIG. 1) whether the condition of the event A3 is satisfied all the time. If it is detected within the pre-set Time To Trigger TTT that the condition of the event A3 is satisfied all the time, the mobile terminal is triggered at time t2 to perform measurement reporting to the source cell. Starting from time t2, the source cell receives and analyzes a measurement report reported by the mobile terminal, and performs processing such as switching judgment, reception control and so on. If, upon the switching judgment, it is determined to perform switching, the source cell may send a switching instruction to the mobile terminal after elapse of predetermined switching preparation time (corresponding to the period of time from time t2 to time t3 as shown in FIG. 1). Upon receipt of the switching instruction from the source cell, the mobile terminal may disconnect from the source cell at time t3. Starting from time t1 to time t3, the mobile terminal is in the state 2. In addition, in the state 1 and the state 2, the mobile terminal is kept in connection with the source cell.

Starting from time t3, the mobile terminal is in state 3, and performs switching from the source cell to the target cell to be connected to the target cell and, after elapse of predetermined switching execution time, completes switching from the source cell to the target cell at time t4.

In addition, if the source cell and the target cell constitute Heterogeneous Networks, for example if the source cell is a small cell while the target cell is a macro cell, the switching of the mobile terminal from the source cell to the target cell will also be influenced due to the characteristics of the Heterogeneous Networks. In the switching process of switching the mobile terminal from the small cell to the macro cell, most of switching failure events generally will occur during the state 2. In addition, due to the limitations of transmission power of the small cell, coverage of the small cell is possibly much smaller than coverage of the macro cell, so in the process where the mobile terminal moves out of the small cell, a signal intensity from the small cell will possibly drop fast, and a signal from the macro cell will also produce an interference upon the mobile terminal. Hence, during the state 2, a signal quality of the mobile terminal will drop rapidly, such that a Radio Link Failure (RLF) possibly occurs, thereby further causing occurrence of switching failure events of the mobile terminal.

Hence, when the mobile terminal moves from the small cell to the macro cell and a switching occurs thereto, if the conventional parameter configuration adapted for homogeneous cells is still adopted, time taken by TTT will be too long, and a probability of failure of the switching of the mobile terminal will be high since the signal quality of the mobile terminal drops too fast during the TTT. Hence, shortening the time taken by the TTT can enable the mobile terminal to disconnect from the small cell in advance, such that the mobile terminal enters the state 3 earlier. In addition, since the coverage range of the macro cell is larger, a signal quality of the macro cell will not change obviously, so no great influence will be produced if the mobile terminal enters the state 3 earlier. Hence, shortening the time taken by the TTT and optimizing parameters related to the switching belong to a manner of reducing a switching recognition probability of the mobile terminal. For details, please refer to related contents in 3GPP TR 36.839.

However, the manner of shortening the time taken by the TTT also causes some problems below. For example, as the time taken by the TTT is reduced, a higher probability of ping-pong switching of the mobile terminal will be caused. Reducing the probability of failure of the switching of the mobile terminal by adopting the manner of shortening the TTT is based on the premise of prejudicing the probability of ping-pong switching of the mobile terminal. After the TTT is shortened, a switching event will occur easily if the mobile terminal has undergone a deep fading. Subsequently, the mobile terminal is possibly switched to the original small cell again, thereby causing occurrence of ping-pong switching, which will deteriorate a service quality of a user. In addition, after the TTT is shortened, a service quality of an edge user of the small cell will deteriorate, and a Cell Range Expansion (CRE) introduced to cause as many mobile terminals as possible to belong to the small cell will deteriorate the service quality of the edge user of the small cell. Besides, in the case of Heterogeneous Networks, the coverage of the small cell is very irregular, wireless channel conditions at different positions possibly have very great differences, and the function performed by the conventional MSE strategy in the case of Heterogeneous Networks is also very limited, so a separate TTT parameter configuration is not applicable to all the cases.

In addition, for example, the small cell possibly adjusts its transmission power according to traffic cases, so that the coverage of the small cell is possibly contracted or expanded correspondingly. Besides, the coverage of the small cell will possibly be smaller, so the channel change in the small cell will possibly be greater. In addition, the macro cell will possibly produce an influence upon the small cell; for example, if the small cell is closer to the macro cell, the coverage of the small cell will be contracted, thereby causing the coverage of the small cell irregular.

It follows that the object of not only improving the probability of success of switching the mobile terminal from the source cell to the target cell but also reducing the probability of ping-pong switching of the mobile terminal cannot be achieved by only adopting the manner of shortening the TTT. Hence, the invention proposes a novel and creative solution, so as to reduce the probability of ping-pong switching of the mobile terminal while improving the probability of success of switching the mobile terminal, thereby providing a user with seamless and stable network coverage.

Figure 2:
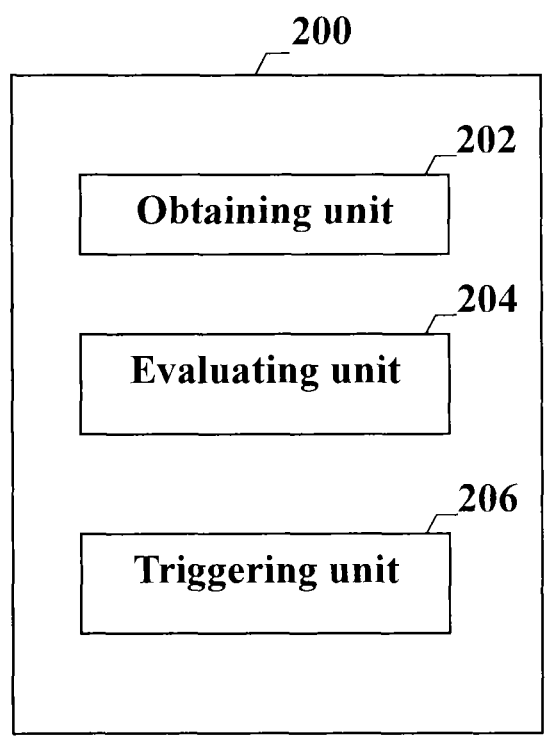
FIG. 2 is a block diagram illustrating a configuration of a device in a wireless communication system according to an embodiment of the invention.

Hereinafter, a configuration of a device in a wireless communication system according to an embodiment of the invention will be described combined with FIG. 2. FIG. 2 is a block diagram illustrating a configuration of a device in a wireless communication system according to an embodiment of the invention.

As shown in FIG. 2, a device 200 in a wireless communication system may comprise an obtaining unit 202, an evaluating unit 204 and a triggering unit 206.

The obtaining unit 202 can obtain a signal quality of a mobile terminal with respect to a source cell.

As described above in FIG. 1, in order to switch the mobile terminal from the source cell to the target cell, it is necessary to detect whether conditions of entering some events such as the event A3 or the event A5 or the like are satisfied, thereby triggering the mobile terminal to report a measurement result, which belongs to event trigger reporting of the mobile terminal. Of course, the mobile terminal may also periodically report the measurement result. The process of periodically reporting by the mobile terminal will not be described in detail herein since it is relatively simple. The application mainly addresses the event trigger reporting of the mobile terminal.

To judge whether the mobile terminal performs switching and when the mobile terminal performs switching, it is possibly necessary to obtain a signal quality of the mobile terminal with respect to the source cell, and in some cases, it is also possibly necessary to obtain a signal quality of the mobile terminal with respect to the target cell. The signal quality of the mobile terminal with respect to the source cell or the target cell for example may be indicated by a receiving signal intensity and/or a carrier interference-to-noise ratio of the source cell or the target cell.

Actually, in Long Term Evolution (LTE) standard of the Universal Mobile Telecommunications System, for switching inside E-UTRAN, several conditions of entering events are defined to trigger the mobile terminal to report the measurement result, wherein the event A3 and the event A5 are representative two, and remaining several events are event A1, event A2, event A4, event A6 and the like. Specifically, the conditions of entering the above plurality of events are described in 3GPP TR 36.311. For example, the condition of entering the event A1 is that the signal quality of the source cell is higher than a predetermined threshold value, the condition of entering the event A2 is that the signal quality of the source cell is lower than a predetermined threshold value, the condition of entering the event A3 is that the signal quality of the target cell is higher than an offset with respect to the signal quality of the source cell, the condition of entering the event A4 is that the signal quality of the target cell is higher than a predetermined threshold value, the condition of entering the event A5 is that the signal quality of the source cell is lower than a predetermined threshold value while the signal quality of the target cell is higher than another predetermined threshold value, and the condition of entering the event A6 is that the signal quality of the target cell is higher than an offset with respect to the signal quality of a Secondary Cell (SCell). In addition, all of the events A1 through A5 are designed for the conventional homogeneous network environment, while the event A6 is designed for a carrier aggregation case.

Returning to FIG. 2, the evaluating unit 204 in the device 200 can evaluate, according to a plurality of signal qualities of the mobile terminal with respect to the source cell which are obtained every predetermined period of time, a variation degree of the signal quality of the mobile terminal with respect to the source cell.

The mobile terminal can obtain one signal quality of the mobile terminal with respect to the source cell every predetermined period of time, and thereby can obtain a plurality of signal qualities of the mobile terminal with respect to the source cell after a plurality of predetermined periods of time. According to the obtained plurality of signal qualities, a variation degree of the signal quality of the mobile terminal with respect to the source cell can be evaluated. For example, a difference among the obtained plurality of signal qualities of the mobile terminal with respect to the source cell can be calculated, and a variation degree of the signal quality of the mobile terminal with respect to the source cell can be calculated according to the calculated difference.

Specifically, it is assumed that the mobile terminal obtains at time $t_1$ a signal quality $q_1$ of the mobile terminal with respect to the source cell, obtains at time $t_2$ a signal quality $q_2$ of the mobile terminal with respect to the source cell, ..., obtains at time $t_i$ a signal quality $q_i$ of the mobile terminal with respect to the source cell, ..., obtains at time $t_j$ a signal quality $q_j$ of the mobile terminal with respect to the source cell, ..., and obtains at time $t_n$ a signal quality $q_n$ of the mobile terminal with respect to the source cell, where all of i, j and n are natural numbers, and $1 \leq i \leq j \leq n$. A difference $(q_i - q_j)$ between the signal quality $q_i$ of the mobile terminal with respect to the source cell which is obtained at time $t_i$ and the signal quality $q_j$ of the mobile terminal with respect to the source cell which is obtained at time $t_j$ can be calculated, and a variation degree of the signal quality of the mobile terminal with respect to the source cell can be evaluated according to the calculated difference $(q_i - q_j)$. For example, the calculated difference $(q_i - q_j)$ can be divided by a period of time $(t_j - t_i)$ to obtain a variation rate $r = (q_i - q_j)/(t_j - t_i)$ of the signal quality of the mobile terminal with respect to the source cell within the period of time $(t_j - t_i)$, and the variation rate obtained from the calculation can be compared with a predetermined rate threshold value. If the variation rate r is greater than the predetermined rate threshold value, it is indicated that the signal quality of the mobile terminal with respect to the source cell is deteriorating faster, that is, a variation degree of the signal quality of the mobile terminal with respect to the source cell is greater. If the variation rate r is less than or equal to the predetermined rate threshold value, it is indicated that the signal quality of the mobile terminal with respect to the source cell is deteriorating more slowly, that is, a variation degree of the signal quality of the mobile terminal with respect to the source cell is smaller. As should be understood by those skilled in the art, the manner of evaluating a variation degree of the signal quality of the mobile terminal with respect to the source cell according to a difference among a plurality of signal qualities of the mobile terminal with respect to the source cell is only exemplary but not limitative, wherein, the predetermined rate threshold value can be pre-determined according to requirements or determined according to experiments.

Returning to FIG. 2, the triggering unit 206 in the device 200 can be trigger the mobile terminal, according to the variation degree of the signal quality of the mobile terminal with respect to the source cell, to report a measurement result.

Figure 3:
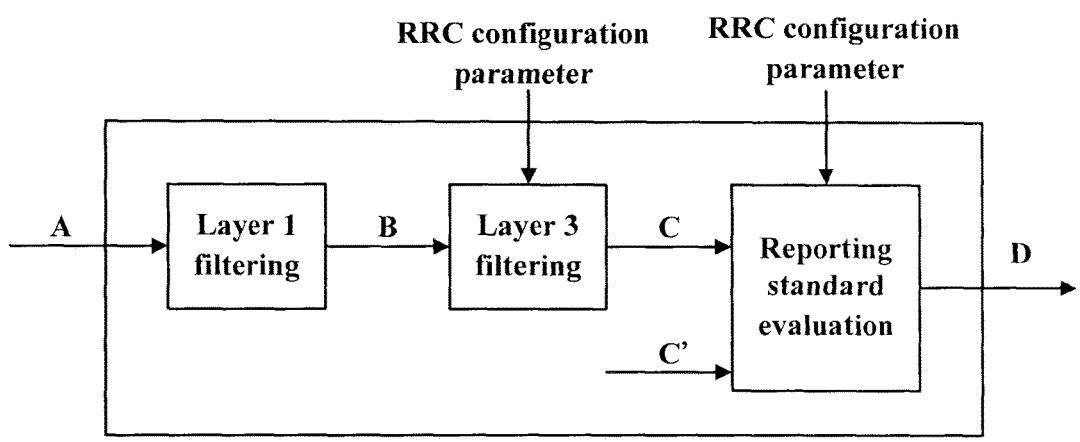
FIG. 3 is a schematic view illustrating a measurement reporting model of the mobile terminal.

Hereinafter, a measurement reporting model of the mobile terminal will be described combined with FIG. 3. FIG. 3 is a schematic view illustrating a measurement reporting model of the mobile terminal.

As shown in FIG. 3, at point A, a measurement result from a physical layer is inputted to a layer 1 filtering phase to perform layer 1 filtering; and at point B, a result after the layer 1 filtering is inputted to a layer 3 filtering phase to perform layer 3 filtering. At point C, a result after the layer 3 filtering is inputted to a reporting standard evaluation phase to perform a reporting standard evaluation, thereby judging whether a condition of entering each of the event A1 through event A6 is satisfied. If it is judged that a condition of entering a corresponding event is satisfied, the mobile terminal will report a measurement result at point D. In addition, both the layer 3 filtering and the reporting standard evaluation can perform parameter configurations through related signalling of RRC.

As stated above, the evaluating unit can evaluate a variation degree of the signal quality of the mobile terminal with respect to the source cell. As described in FIG. 3, the evaluating unit can input the evaluated variation degree of the signal quality of the mobile terminal with respect to the source cell to the reporting standard evaluation phase at point C' in a measurement reporting model of the mobile terminal. If the evaluated variation degree of the signal quality of the mobile terminal with respect to the source cell is greater, the mobile terminal can be recognized as leaving the coverage of the source cell at a relatively faster speed, so the mobile terminal can be triggered to report the measurement result at point D in the measurement reporting model of the mobile terminal, without needing to wait for the TTT, and correspondingly, the base station can also configure the switching process of the mobile terminal rapidly, thereby reducing the probability of failure of switching of the mobile terminal which moves at a higher speed. On the contrary, if the evaluated variation degree of the signal quality of the mobile terminal with respect to the source cell is smaller, the variation degree of the signal quality of the mobile terminal with respect to the source cell can be continued to be evaluated.

According to a preferred embodiment of the invention, the obtaining unit is further adapted to judge, according to the signal quality of the mobile terminal with respect to the source cell, whether a signal quality of the mobile terminal with respect to a target cell is obtained; and the evaluating unit is further adapted to evaluate a variation degree of signal qualities of the mobile terminal with respect to the source cell and the target cell, according to the plurality of signal qualities of the mobile terminal with respect to the source cell and the target cell which are obtained every predetermined period of time.

For a mobile terminal located at a center position of the source cell or a mobile terminal with a higher signal quality, there is a less probability for the mobile terminal to be switched. On the contrary, for a mobile terminal located at an edge position of the source cell or a mobile terminal with a lower signal quality, there is a greater probability for the mobile terminal to be switched. Therefore, a signal quality Mp of the mobile terminal with respect to the source cell can be compared with a first predetermined threshold Thresh1 (i.e. Threshold1 as defined in reportConfigEUTRA), and it can be judged according to a comparison result whether it is necessary to obtain a signal quality Mn of the mobile terminal with respect to the target cell. For example, in a case where the signal quality Mp of the mobile terminal with respect to the source cell is greater than or equal to the first predetermined threshold Thresh1, there is a less probability for the mobile terminal to be switched, so it is unnecessary to obtain the signal quality Mn of the mobile terminal with respect to the target cell. On the contrary, in a case where the signal quality Mp of the mobile terminal with respect to the source cell is less than the first predetermined threshold Thresh1, there is a greater probability for the mobile terminal to be switched, so it is necessary to obtain the signal quality Mn of the mobile terminal with respect to the target cell.

The first predetermined threshold Thresh1 can be determined according to a configuration parameter of the source cell. The configuration parameter of the source cell for example may be coverage of the source cell, transmission power of the source cell or a mobile terminal speed supportable by the source cell, or the like. For example, according to simulation parameters given in 3GPP TR 36.814, transmission power of the source cell may be 30 db, an antenna gain may be 5 dB, and a fading formula of the source cell may be: L=140.7+36.7×log$_{10}$R, where R represents the coverage of the source cell. For example, if a radius R$_{max}$ of the coverage of the source cell is assumed to be 200 miles, an appropriate first predetermined threshold Thresh1 can be calculated roughly, so as to start to obtain the signal quality Mn of the mobile terminal with respect to the target cell within a surrounding region of 30 meters. As should be understood by those skilled in the art, if the configuration parameter of the source cell changes, the value of the first predetermined threshold Thresh1 also changes correspondingly.

In addition, as a preferred embodiment, in comparing the signal quality Mp of the mobile terminal with respect to the source cell with the first predetermined threshold Thresh1, other factors such as frequency-specific compensation Ofp (i.e. offsetFreq as defined in measObjectEUTRA) of the source cell, cell-specific compensation Ocp (i.e. cellIndividualOffset as defined in measObjectEUTRA) of a primary cell (Pcell), hysteresis parameter Hys of events (i.e. a hysteresis as defined in reportConfigEUTRA) and so on can also be considered. Specifically, when Mp+Ofp+Ocp−Hys≥Thresh1, there is a less probability for the mobile terminal to be switched, so it is unnecessary to obtain the signal quality Mn of the mobile terminal with respect to the target cell. On the contrary, when Mp+Ofp+Ocp−Hys<Thresh1, there is a greater probability for the mobile terminal to be switched, so it is necessary to obtain the signal quality Mn of the mobile terminal with respect to the target cell. In addition, it should be noted that if the primary cell (Pcell) is not set, the cell-specific compensation Ocp of the primary cell (PCell) can be set to be zero.

If the signal quality Mp of the mobile terminal with respect to the source cell is lower than the first predetermined threshold Thresh1 or Mp+Ofp+Ocp−Hys<Thresh1, the mobile terminal can obtain the signal quality Mp of the mobile terminal with respect to the source cell and the signal quality Mn of the mobile terminal with respect to the target cell at current time $t_1$ and, after elapse of a predetermined period of time, can obtain a signal quality Mp' of the mobile terminal with respect to the source cell and a signal quality Mn' of the mobile terminal with respect to the target cell at next time $t_2$. According to the obtained plurality of signal qualities of the mobile terminal with respect to the source cell and the target cell, the variation degree of the signal qualities of the mobile terminal with respect to the source cell and the target cell can be evaluated. For example, a difference ΔM=Mp−Mn between the signal quality Mp of the mobile terminal with respect to the source cell and the signal quality Mn of the mobile terminal with respect to the target cell which are obtained at current time $t_1$, and a difference ΔM'=Mp'−Mn' between the signal quality Mp' of the mobile terminal with respect to the source cell and the signal quality Mn' of the mobile terminal with respect to the target cell which are obtained at next time $t_2$ can be calculated, and a difference (ΔM'−ΔM) between ΔM' and ΔM can be calculated, and the variation degree of the signal qualities of the mobile terminal with respect to the source cell and the target cell are evaluated according to the calculated difference (ΔM'−ΔM) between ΔM' and ΔM. For example, the calculated difference (ΔM'−ΔM) between ΔM' and ΔM can be compared with an offset Off of the variations of the signal qualities of the mobile terminal with respect to the source cell and the target cell. If the calculated difference (ΔM'−ΔM) between ΔM' and ΔM is greater than the offset Off, the variation degree of the signal qualities of the mobile terminal with respect to the source cell and the target cell is regarded as being greater; and if the calculated difference (ΔM'−ΔM) between ΔM' and ΔM is less than or equal to the offset Off, the variation degree of the signal qualities of the mobile terminal with respect to the source cell and the target cell is regarded as being smaller.

According to a preferred embodiment of the invention, the predetermined period of time is pre-set or is determined according to a reporting and evaluation period of the measurement result of the mobile terminal.

For example, the predetermined period of time can be configured through RRC signalling. Specifically, for example a timer can be arranged, and the timer is configured through RRC signaling, such that the timer performs an update every predetermined period of time. For example, the predetermined period of time can be set to be 1 second, such that the timer updates once every 1 second.

In addition, the measurement reporting model of the mobile terminal is described above with reference to FIG. 3. As shown in FIG. 3, a result of the measurement result from the physical layer after passing through the layer 1 filtering and the layer 3 filtering is inputted to the reporting standard estimation phase to perform a reporting standard evaluation. In addition, in performing parameter configuration of the layer 3 filtering, a sampling rate is defined to be 200 ms, and on this basis the setting of the parameter is performed. However, the actual sampling rate of the mobile terminal is often not 200 ms, but the terminal can perform further parameter adjustment according to actual cases, thereby ensuring consistence of parameter configuration. In addition, in the measurement reporting model, a reporting evaluation period of the measurement result of the mobile terminal is generally a pre-set value, e.g. 200 milliseconds. Therefore, by taking the reporting evaluation period of the measurement result of the mobile terminal as a reference value, multiples of the reporting evaluation period of the measurement result of the mobile terminal may be set to be the predetermined period of time. For example, if the reporting evaluation period of the measurement result of the mobile terminal is 200 milliseconds, 5 multiples of 200 milliseconds, i.e. 1 second, may be set to be the predetermined period of time.

According to a preferred embodiment of the invention, the evaluating unit is further adapted to determine an offset of the variations of the signal qualities of the mobile terminal with respect to the source cell and the target cell according to configuration parameters of the source cell, calculate a signal quality difference between the signal qualities of the mobile terminal with respect to the source cell and the target cell, and use a difference between the signal quality difference and the offset as a judgment threshold value for evaluating the variation degree of the signal qualities of the mobile terminal with respect to the source cell and the target cell.

To make it possible to recognize within the predetermined period of time a mobile terminal leaving the source cell at a higher speed, it is necessary to determine the offset Off of the variations of the signal qualities of the mobile terminal with respect to the source cell and the target cell. The offset Off can be determined according to parameter configuration of the source cell. The configuration parameter of the source cell for example may be coverage of the source cell, transmission power of the source cell, or a mobile terminal speed supportable by the source cell, or the like.

For example, according to simulation parameters given in 3GPP TR 36.814, transmission power of the source cell may be 30 dB, an antenna gain may be 5 dB, and a fading formula of the source cell may be: L=140.7+36.7×log$_{10}$R, where L represents a path loss, and R represents a distance between a target position where the mobile terminal lies and a base station of the source cell. For example, a maximum distance between the target position where the mobile terminal lies and the base station of the source cell may be assumed to be 200 meters, that is, a radius R$_{max}$ of the coverage of the source cell may be assumed to be 200 meters. In addition, a distance ΔR=v×T by which the mobile terminal moves within the period of time T can be calculated according to the mobile terminal speed v supportable by the source cell. For example, assuming that a range of the mobile terminal speed supportable by the source cell is 15 km/h to 120 km/h and that the predetermined period of time T is 1 second, by taking the mobile terminal speed 15 km/h as a reference, the distance y which the mobile terminal moves within the predetermined period of time, 1 second, can be calculated as follows: ΔR=v×T=(15 km/h)×(1 second)≈4.2km. Hence, the variation Δq of the signal quality of the mobile terminal with respect to the source cell can be calculated from the fading formula L=140.7+36.7×log$_{10}$R as follows:

$$\Delta q = 36.7 \times \log_{10}((R + \Delta R)/R)$$
$$= 36.7 \times \log_{10}(1 + \Delta R/R) <$$
$$36.7 \times \log_{10}(1 + \Delta R/R_{max})$$
$$= 36.7 \times \log_{10}(1 + 4.2/200)$$
$$= 0.33 \text{ dB}$$

Hence, the offset Off of the variations of the signal qualities of the mobile terminal with respect to the source cell and the target cell can be set to be 0.33 dB. As should be understood by those skilled in the art, if the value of the configuration parameter of the source cell changes, the value of the offset Off of the variations of the signal qualities of the mobile terminal with respect to the source cell and the target cell which is determined from the above calculation process also changes correspondingly.

After the offset Off of the variations of the signal qualities of the mobile terminal with respect to the source cell and the target cell is calculated, the judgment threshold value Thres_Drop for evaluating the variation degree of the signal qualities of the mobile terminal with respect to the source cell and the target cell can be calculated according to the calculated offset Off. Assuming that the signal quality of the mobile terminal with respect to the source cell which is obtained at current time t$_1$ is Mp and that the signal quality of the mobile terminal with respect to the target cell which is obtained at current time t$_1$ is Mn, a signal quality difference (Mp−Mn) between the signal quality Mp of the mobile terminal with respect to the source cell and the signal quality Mn of the mobile terminal with respect to the target cell at current time t$_1$ can be calculated, and a difference (Mp−Mn−Off) between the signal quality difference (Mp−Mn) and the offset Off is used as the judgment threshold value Thres_Drop, that is, Thres_Drop=Mp−Mn−Off.

According to a preferred embodiment of the invention, the evaluating unit is further adapted to compare a signal quality difference between current signal qualities of the mobile terminal with respect to the source cell and the target cell with the judgment threshold value determined at a previous time, update, according to a comparison result, an indicator for indicating the variation degree of the signal qualities of the mobile terminal with respect to the source cell and the target cell, and trigger the mobile terminal to report the measurement result when a value of the indicator exceeds a predetermined threshold value (i.e. a second predetermined threshold Thres2).

Turning again to the above example, assuming that the signal quality of the mobile terminal with respect to the source cell which is obtained at time t$_2$ after elapse of the predetermined period of time is Mp' and that the signal quality of the mobile terminal with respect to the target cell which is obtained at next time t$_2$ after elapse of the predetermined period of time is Mn', a signal quality difference (Mp'−Mn') between the signal quality Mp' of the mobile terminal with respect to the source cell and the signal quality Mn' of the mobile terminal with respect to the target cell at next time t$_2$ can be calculated, and the signal quality difference (Mp'−Mn') is compared with the judgment threshold value (Thres_Drop=Mp−Mn−Off). If Mp'−Mn'>Thres_Drop=Mp−Mn−Off, the variation degree of the signal qualities of the mobile terminal with respect to the source cell and the target cell may be regarded as being greater; and if Mp'−Mn'≤Thres_Drop=Mp−Mn−Off, the variation degree of the signal qualities of the mobile terminal with respect to the source cell and the target cell may be regarded as being smaller.

According to a preferred embodiment of the invention, the evaluating unit is further adapted to update the judgment threshold value each time a signal quality difference between the signal qualities of the mobile terminal with respect to the source cell and the target cell is calculated.

Turning again to the above example, upon completion of the above comparison, the judgment threshold value Thres_Drop can be updated using a difference (Mp'−Mn'−Off) between the signal quality difference (Mp'−Mn') at time t$_2$ and the offset Off, that is, Thres_Drop=Mp'−Mn'−Off. Similarly, the updated judgment threshold is used in performing a compression next time, and the judgment threshold value is updated again upon completion of the comparison.

As stated above, the signal quality difference ΔM'=Mp'−Mn' at time t$_2$ can be compared with the judgment threshold value (Thres_Drop=Mp−Mn−Off) obtained according to the signal quality difference ΔM=Mp−Mn at time t$_1$. After a comparison result is obtained, an indicator for indicating the variation degree of the signal qualities of the mobile terminal with respect to the source cell and the target cell can be updated according to the comparison result. The indicator can represent the variation degree of the signal qualities of the mobile terminal with respect to the source cell and the target cell using quantified numerical values, and if the numerical value of the indicator is greater, it is indicated that the variation degree of the signal qualities of the mobile terminal with respect to the source cell and the target cell are also greater. According to the comparison result of the signal quality difference with the judgment threshold value, it can be determined whether to increase the value of the indicator or reduce the value of the indicator or keep the value of the indicator unchanged, and it is determined whether an amplitude of the value of the indicator which is updated each time is large or small.

Upon completion of the update of the value of the indicator, it can be determined according to the value of the indicator whether to trigger the mobile terminal to report the measurement result. For example, the value of the indicator can be compared with the predetermined threshold value (i.e. the second predetermined threshold Thres2), and the mobile terminal is triggered to report the measurement result when the value of the indicator exceeds the predetermined threshold value (i.e. the second predetermined threshold Thresh2), without needing to wait for TTT.

The second predetermined threshold Thresh2 can be determined according to a configuration parameter of the source cell. The configuration parameter of the source cell for example may be coverage of the source cell, transmission power of the source cell or a mobile terminal speed supportable by the source cell, or the like. For example, according to simulation parameters given in 3GPP TR 36.814, transmission power of the source cell may be 30 dB, an antenna gain may be 5 dB, and a fading formula of the source cell may be: $L=140.7+36.7 \times \log_{10} R$, where R represents the coverage of the source cell. For example, if a radius $R_{max}$ of the coverage of the source cell is assumed to be 200 meters, the mobile terminal will possibly start to obtain the signal quality Mn of the mobile terminal with respect to the target cell within a surrounding region of 30 meters. In addition, assuming that a range of the mobile terminal speed supportable by the source cell is 15 km/h to 120 km/h, by taking the mobile terminal speed 15 km/h as a reference, the shortest time during which the mobile terminal moves in the surrounding region of 30 meters can be calculated as follows: $t=1/v=30$ m/(15/3.6)m/s=7.2 s. Hence, the second predetermined threshold Thresh2 is set to be 8. As should be understood by those skilled in the art, if the configuration parameter of the source cell changes, the value of the second predetermined threshold Thresh2 which is determined from the above calculation process also changes correspondingly.

According to a preferred embodiment of the invention, the evaluating unit is further adapted to increase the value of the indicator, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is greater than or equal to the judgment threshold value determined at the previous time.

Turning again to the above example, if the signal quality difference A M'=Mp'-Mn' between the signal qualities of the mobile terminal with respect to the source cell and the target cell at time $t_2$ is greater than or equal to the judgment threshold value Thres_Drop=Mp-Mn-Off obtained according to the signal quality difference $\Delta M=Mp-Mn$ at time $t_1$, the variation degree of the signal qualities of the mobile terminal with respect to the source cell and the target cell may be regarded as being greater, so the value of the indicator can be increased; for example, a value by which the value of the indicator is to be increased can be determined according to a variation amount ($\Delta M'-\Delta M$) between the signal quality difference $\Delta M'$ at time $t_2$ and the signal quality difference $\Delta M$ at time $t_1$. In addition, mobile terminals with different speeds also have different variation degree of signal qualities. If a speed of a mobile terminal is faster, a signal quality of the mobile terminal varies faster, thereby making it possible to reach the edge of the source cell within shorter time. That is, the variation degree of the signal qualities undergone by the mobile terminals with different speeds are also different. Hence, the amplitude of the value by which the value of the indicator is increased each time can be adjusted according to variation degree of signal qualities of the mobile terminal which are caused by the speed of the mobile terminal. For example, if the speed of the mobile terminal is faster such that variation degree of signal qualities of the mobile terminal are greater, the value by which the value of the indicator is increased is also greater; and vice versa.

According to a preferred embodiment of the invention, the evaluating unit is further adapted to reduce the value of the indicator or keep the value of the indicator unchanged, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is less than the judgment threshold value determined at the previous time.

Turning again to the above example, if the signal quality difference $\Delta M'=Mp'-Mn'$ between the signal qualities of the mobile terminal with respect to the source cell and the target cell at time $t_2$ is less than the judgment threshold value Thres_Drop=Mp-Mn-Off obtained according to the signal quality difference $\Delta M=Mp-Mn$ at time $t_1$, the variation degree of the signal qualities of the mobile terminal with respect to the source cell and the target cell may be regarded as being smaller, so the value of the indicator may be reduced or the value of the indicator may be kept unchanged; for example, a value to be reduced from the value of the indicator can be determined according to a variation amount ($\Delta M'-\Delta M$) between the signal quality difference $\Delta M'$ at time $t_2$ and the signal quality difference $\Delta M$ at time $t_1$. Similarly, the amplitude of the value reduced from the value of the indicator each time can be adjusted according to variation degree of signal qualities of the mobile terminal which are caused by the speed of the mobile terminal.

As an example, a variation value ND of the indicator can be calculated from the following formula according to a magnitude of a speed at which the signal quality varies.

$$ND = \begin{cases} \min\left\{1, \left\lfloor \alpha_1 \times \frac{\Delta M - \Delta M'}{\text{Off}} \right\rfloor \right\}, & \Delta M' \geq \text{Thres\_Drop} \\ \max\left\{0, \left\lceil \alpha_2 \times \frac{\Delta M - \Delta M'}{\text{Off}} \right\rceil \right\}, & \Delta M' < \text{Thres\_Drop} \end{cases}$$

where, $\Delta M=\text{Thres\_Drop}+\text{Off}$, and $\alpha_1$ and $\alpha_2$ are predetermined adjustment parameters. According to the above formula, if the variation $\Delta M'$ of the signal quality is greater than or equal to the judgment threshold value Thres_Drop, it means that the signal quality varies faster, so it is necessary to increase the value of the indicator, and a minimum value by which the value of the indicator is increased is 1. In addition, if the variation $\Delta M'$ of the signal quality is less than the judgment threshold value Thres_Drop, it means that the signal quality varies more slowly, so the value of the indicator may be kept unchanged or the value of the indicator may be reduced, so a maximum value by which the value of the indicator varies is 0. The adjustment parameters $\alpha_1$ and $\alpha_2$ can adjust influences produced by the magnitude of the speed at which the signal quality varies upon the variation of the value of the indicator. For example, when $\alpha_1=0$ or $\alpha_2=0$, for different cases, the variation value ND of the indicator is equal to 1 or 0, that is, the value of the indicator is increased by 1 each time or kept unchanged. When $\alpha_1=1$ or $\alpha_2=1$, the variation value ND of the indicator is directly equal to down-rounding ($\Delta M-\Delta M'$)/Off or uprounding (ΔM−ΔM')/Off. When $\alpha_1>1$ or $\alpha_2>1$, the variation value ND of the indicator will be greater. By setting the two parameter values $\alpha_1$ and $\alpha_2$, different values can be endowed for the two different cases, respectively.

As can be seen from the above formula, the variation value ND of the indicator may be either a positive value or a negative value. When the variation value ND of the indicator is a positive value, it is indicated that the value of the indicator is increased. When the variation value ND of the indicator is a negative value, it is indicated that the value of the indicator is reduced. As should be understood by those skilled in the art, the above manner of calculating the variation value ND of the indicator is only an example, and the variation value ND of the indicator can also be calculated in other manners.

According to a preferred embodiment of the invention, the evaluating unit is further adapted to reset the indicator or reduce the value of the indicator by a predetermined value in the case that the value of the indicator does not vary within a predetermined period.

The following case also possibly exists: a user is possibly stabilized at a certain position in the source cell after undergoing a signal quality variation to a greater degree. That is, after the mobile terminal is stabilized at a certain position in the source cell, the variation degree of the signal quality of the mobile terminal is very small. However, since the mobile terminal has undergone the signal quality variation to a greater degree, the mobile terminal is possibly very close to the second predetermined threshold Thresh2. Hence, a variation of a wireless channel will possibly cause switching of the mobile terminal. Hence, a predetermined period, e.g. a hysteresis period $T_{hyst}$, can be set for this case. If the value of the indicator is neither increased nor reduced within the predetermined period, the indicator can be reset or reduced by a predetermined value.

According to a preferred embodiment of the invention, the evaluating unit is further adapted to compare the value of the indicator with a predetermined upper limit value of the indicator, and not to increase the value of the indicator any longer when the value of the indicator reaches the upper limit value of the indicator, wherein the upper limit value of the indicator is greater than or equal to the predetermined threshold value (i.e. the second predetermined threshold Thresh2).

To further save resources and improve operating efficiency, the value of the indicator may not be increased unlimitedly. That is to say, a predetermined upper limit value or maximum value of the indicator can be set for the indicator, and the upper limit value or maximum value of the indicator can be equal to or greater than the second predetermined threshold Thresh2. Each time the value of the indicator is to be updated, the value of the indicator can be compared with the predetermined upper limit value or maximum value of the indicator, and the value of the indicator may not be increased no longer when the value of the indicator reaches the upper limit value or maximum value of the indicator. As would be understood by those skilled in the art, the upper limit value or maximum value of the indicator can be determined according to actual requirements or through experiments.

According to a preferred embodiment of the invention, the evaluating unit is further adapted to make the mobile terminal stop reporting the measurement result when the value of the indicator is lower than the predetermined threshold value (i.e. the second predetermined threshold Thresh2).

As can be seen from the above descriptions, the value of the indicator is being updated continuously. If the updated value of the indicator is lower than the second predetermined threshold Thresh2, it means that the variation degree of the signal quality of the mobile terminal is not great, so the mobile terminal can be made to stop reporting the measurement result, thereby making it possible to make the mobile terminal leave the measurement reporting state.

In addition, for a low-speed mobile terminal, since a variation degree of a signal quality of the low-speed mobile terminal is smaller, a probability of failure of switching of the low-speed mobile terminal is generally lower, and a variation of the TTT produces a smaller influence on the low-speed mobile terminal. For the low-speed mobile terminal, setting a longer TTT instead will make contributions to reducing a probability of ping-pong switching. Actually, a main factor influencing a service quality of the low-speed mobile terminal is ping-pong switching.

As an alternative manner, a plurality of event triggers can be set for the mobile terminal; for example, the event A3 and the measurement reporting triggering manner as described above can be used in cooperation. In this way, it is made possible to protect the service quality of the low-speed mobile terminal through the event A3, and also to protect a service quality of a middle-speed or high-speed user in the measurement reporting triggering manner as described above.

In addition, as an alternative manner, the measurement reporting triggering manner as described above can be further improved, thereby avoiding wastage of resources resulting from configuration of a plurality of events. Specifically, according to a preferred embodiment of the invention, the evaluating unit is further adapted to pre-set a minimum judgment threshold value; and when updating the judgment threshold value, set the minimum judgment threshold value as the updated judgment threshold value if the calculated judgment threshold value is less than the minimum judgment threshold value.

For the low-speed mobile terminal, since the variation degree of the signal quality of the low-speed mobile terminal is smaller, it is possible that the calculated judgment threshold value is smaller, thereby causing the probability of the ping-pong switching of the mobile terminal to increase. For this case, a minimum judgment threshold value can be pre-set, and when updating the judgment threshold value, the calculated judgment threshold value is compared with the pre-set minimum judgment threshold value, and the minimum judgment threshold value is set as the updated judgment threshold value in a case where the calculated judgment threshold value is less than the minimum judgment threshold value.

According to a preferred embodiment of the invention, the triggering unit is further adapted to trigger the mobile terminal to report the measurement result, if it is detected that there are consecutive predetermined number of measurement results less than the minimum judgment threshold value, after the minimum judgment threshold value is set as the updated judgment threshold value.

According to a preferred embodiment of the invention, the triggering unit is further adapted to trigger the mobile terminal to report the measurement result, if it is detected that there are more than a predetermined number of measurement results less than the minimum judgment threshold value within the predetermined period of time, after the minimum judgment threshold value is set as the updated judgment threshold value.

Hence, the low-speed mobile terminal can implement switching in the above triggering manner, and meanwhile can also avoid the ping-pong switching of the mobile terminal correspondingly.

Figure 4:
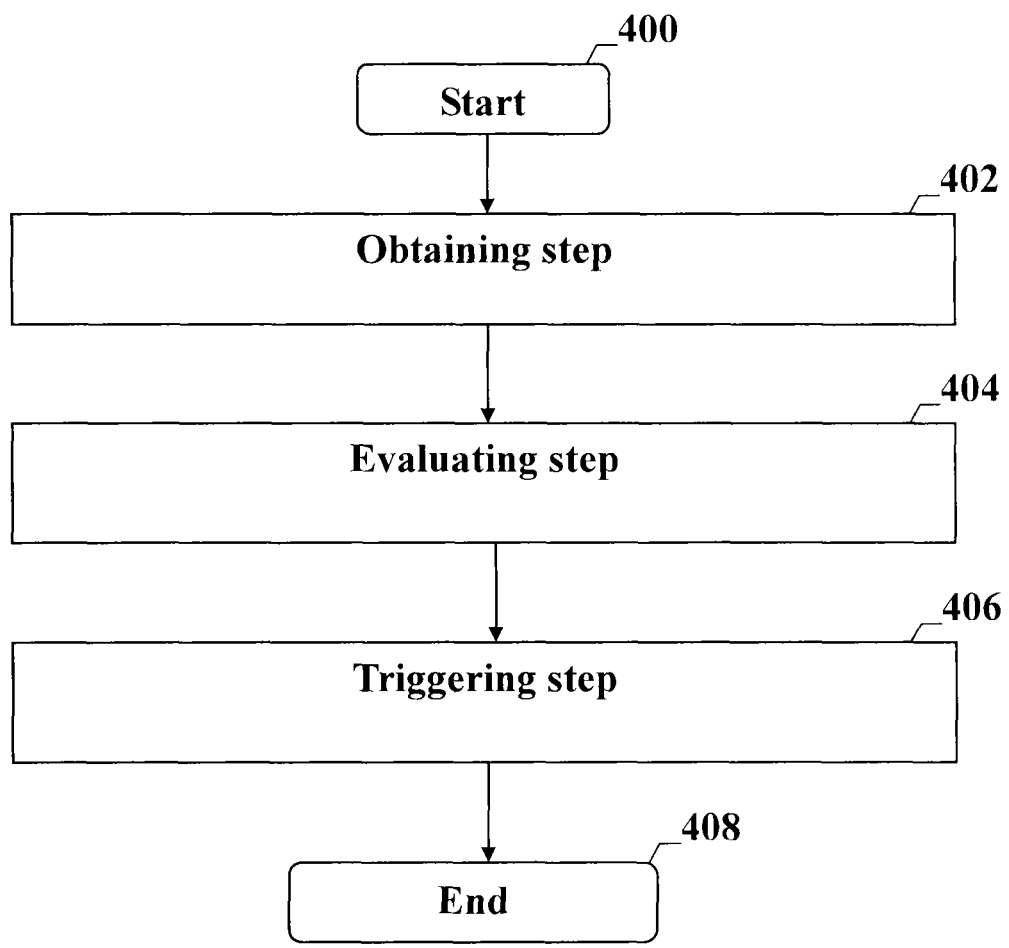
FIG. 4 is a flow chart illustrating a method for use in a wireless communication system according to an embodiment of the invention.

Hereinafter, a method for use in a wireless communication system according to an embodiment of the invention will be described with reference to FIG. 4. FIG. 4 is a flow chart illustrating a method for use in a wireless communication system according to an embodiment of the invention.

As shown in FIG. 4, the method starts from step 400. Following the step 400, the method proceeds to step 402.

The step 402 is an obtaining step. In the step 402, a signal quality of a mobile terminal with respect to a source cell is obtained.

Following the step 402, the method proceeds to step 404.

The step 404 is an evaluating step. In the step 404, a variation degree of the signal quality of the mobile terminal with respect to the source cell is evaluated according to a plurality of signal qualities of the mobile terminal with respect to the source cell which are obtained every predetermined period of time.

Following the step 404, the method proceeds to step 406.

The step 406 is a triggering step. In the step 406, the mobile terminal is triggered, according to the variation degree of the signal quality of the mobile terminal with respect to the source cell, to report a measurement result Lastly, the method ends at step 408.

The method as shown in FIG. 4 is a method corresponding to the device as shown in FIG. 1, and detailed descriptions thereof will not be made repeatedly herein.

Figure 5:
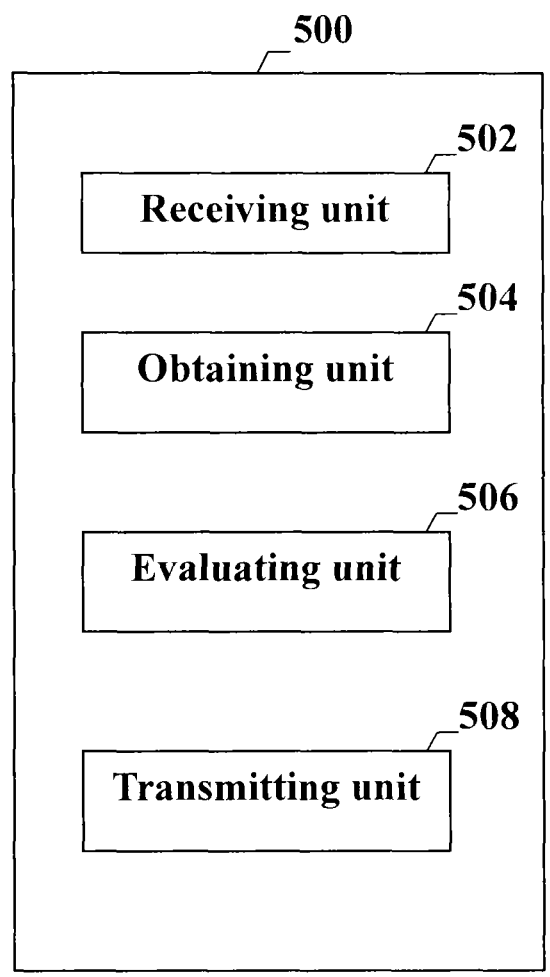
FIG. 5 is a block diagram illustrating a configuration of a device in a wireless communication system according to another embodiment of the invention.

Hereinafter, a configuration of a device in a wireless communication system according to an embodiment of the invention will be described with reference to FIG. 5. FIG. 5 is a block diagram illustrating a configuration of a device in a wireless communication system according to an embodiment of the invention.

As shown in FIG. 5, a device 500 in a wireless communication system may comprise a receiving unit 502, an obtaining unit 504, an evaluating unit 506 and a transmitting unit 508.

The receiving unit 502 can receive an uplink reference signal transmitted by a mobile terminal. The obtaining unit 504 can obtain a signal quality of the mobile terminal with respect to a source cell according to the uplink reference signal. The evaluating unit 506 can evaluate, according to a plurality of signal qualities of the mobile terminal with respect to the source cell which are obtained every predetermined period of time, a variation degree of the signal quality of the mobile terminal with respect to the source cell. The transmitting unit 508 can transmit, according to the variation degree of the signal quality of the mobile terminal with respect to the source cell, an instruction for triggering the mobile terminal to report a measurement result, to the mobile terminal.

Compared with the device 100 as shown in FIG. 1, the device 500 as shown in FIG. 5 is realized at a base station end. The uplink reference signal transmitted by the mobile terminal for example may be an SRS pilot signal, and a base station can obtain a signal quality of an uplink channel by receiving the uplink reference signal. In the case of Time Division Duplexing (TDD), due to the symmetry of an uplink channel and a downlink channel on the same frequency band, a signal quality of the downlink channel can be obtained correspondingly according to the uplink reference signal. Hence, the link monitoring process to be implemented by the mobile terminal can be implemented by the base station, so the base station can obtain a signal quality of the mobile terminal within a predetermined period of time, thereby making it possible to implement at the base station end the cell switching process based on the mobile terminal as described above.

After the base station obtains the signal quality of the mobile terminal with respect to the source cell, the base station can perform a filtering operation on the obtained signal quality, so as to reduce influences produced by fast fading and shadow fading. A subsequent operation of the device 500 is similar to the operation of the device 100 as shown in FIG. 1, but the indicator as described above is maintained by the base station, and since the variation of the signal quality of the mobile terminal with respect to the target cell is possibly not great, the signal quality of the mobile terminal with respect to the target cell can be set as a predetermined reference value.

According to a preferred embodiment of the invention, wherein, the obtaining unit is further adapted to set a signal quality of the mobile terminal with respect to a target cell as a predetermined reference value; and the evaluating unit is further adapted to evaluate, according to the plurality of signal qualities of the mobile terminal with respect to the source cell which are obtained every predetermined period of time and the predetermined reference value, a variation degree of the signal qualities of the mobile terminal with respect to the source cell and the target cell.

According to a preferred embodiment of the invention, wherein, the predetermined period of time is pre-set or is determined according to a reporting and evaluation period of the measurement result of the mobile terminal.

According to a preferred embodiment of the invention, wherein, the evaluating unit is further adapted to determine an offset of the variations of the signal qualities of the mobile terminal with respect to the source cell and the target cell according to configuration parameters of the source cell, calculate a signal quality difference between the signal quality of the mobile terminal with respect to the source cell and the predetermined reference value, and use a difference between the signal quality difference and the offset as a judgment threshold value for evaluating the variation degree of the signal qualities of the mobile terminal with respect to the source cell and the target cell.

According to a preferred embodiment of the invention, wherein, the evaluating unit is further adapted to compare a signal quality difference between a current signal quality of the mobile terminal with respect to the source cell and the predetermined reference value, with a judgment threshold value determined at a previous time, update, according to a comparison result, an indicator for indicating the variation degree of the signal qualities of the mobile terminal with respect to the source cell and the target cell, and trigger the mobile terminal to report the measurement result when a value of the indicator exceeds a predetermined threshold value.

According to a preferred embodiment of the invention, wherein, the evaluating unit is further adapted to increase the value of the indicator, according to a variation amount of the signal quality difference between the current signal quality of the mobile terminal with respect to the source cell and the predetermined reference value and a signal quality difference between a previous time of signal quality of the mobile terminal with respect to the source cell and the predetermined reference value, in the case that the signal quality difference between the current signal quality of the mobile terminal with respect to the source cell and the predetermined reference value is greater than or equal to the judgment threshold value determined at the previous time.

According to a preferred embodiment of the invention, wherein, the evaluating unit is further adapted to reduce the value of the indicator or keep the value of the indicator unchanged, according to a variation amount of the signal quality difference between the current signal quality of the mobile terminal with respect to the source cell and the predetermined reference value and a signal quality difference between a previous time of signal quality of the mobile terminal with respect to the source cell and the predetermined reference value, in the case that the signal quality difference between the current signal quality of the mobile terminal with respect to the source cell and the predetermined reference value is less than the judgment threshold value determined at the previous time.

According to a preferred embodiment of the invention, wherein, the evaluating unit is further adapted to reset the indicator or reduce the value of the indicator by a predetermined value in the case that the value of the indicator does not vary within a predetermined period.

According to a preferred embodiment of the invention, wherein, the evaluating unit is further adapted to compare the value of the indicator with a predetermined upper limit value of the indicator, and not to increase the value of the indicator any longer when the value of the indicator reaches the upper limit value of the indicator, wherein the upper limit value of the indicator is greater than or equal to the predetermined threshold value (i.e. the second predetermined threshold value Thresh2).

According to a preferred embodiment of the invention, wherein, the evaluating unit is further adapted to make the mobile terminal stop reporting the measurement result when the value of the indicator is lower than the predetermined threshold value (i.e. the second predetermined threshold value Thresh2).

According to a preferred embodiment of the invention, wherein, the evaluating unit is further adapted to update the judgment threshold value each time a signal quality difference between the signal quality of the mobile terminal with respect to the source cell and the predetermined reference value is calculated.

According to a preferred embodiment of the invention, wherein, the evaluating unit is further adapted to pre-set a minimum judgment threshold value; and when updating the judgment threshold value, set the minimum judgment threshold value as the updated judgment threshold value if the calculated judgment threshold value is less than the minimum judgment threshold value.

According to a preferred embodiment of the invention, wherein, the triggering unit is further adapted to trigger the mobile terminal to report the measurement result, if it is detected that there are consecutive predetermined number of measurement results less than the minimum judgment threshold value, after the minimum judgment threshold value is set as the updated judgment threshold value.

According to a preferred embodiment of the invention, wherein, the triggering unit is further adapted to trigger the mobile terminal to report the measurement result, if it is detected that there are more than a predetermined number of measurement results less than the minimum judgment threshold value within the predetermined period of time, after the minimum judgment threshold value is set as the updated judgment threshold value.

Figure 6:
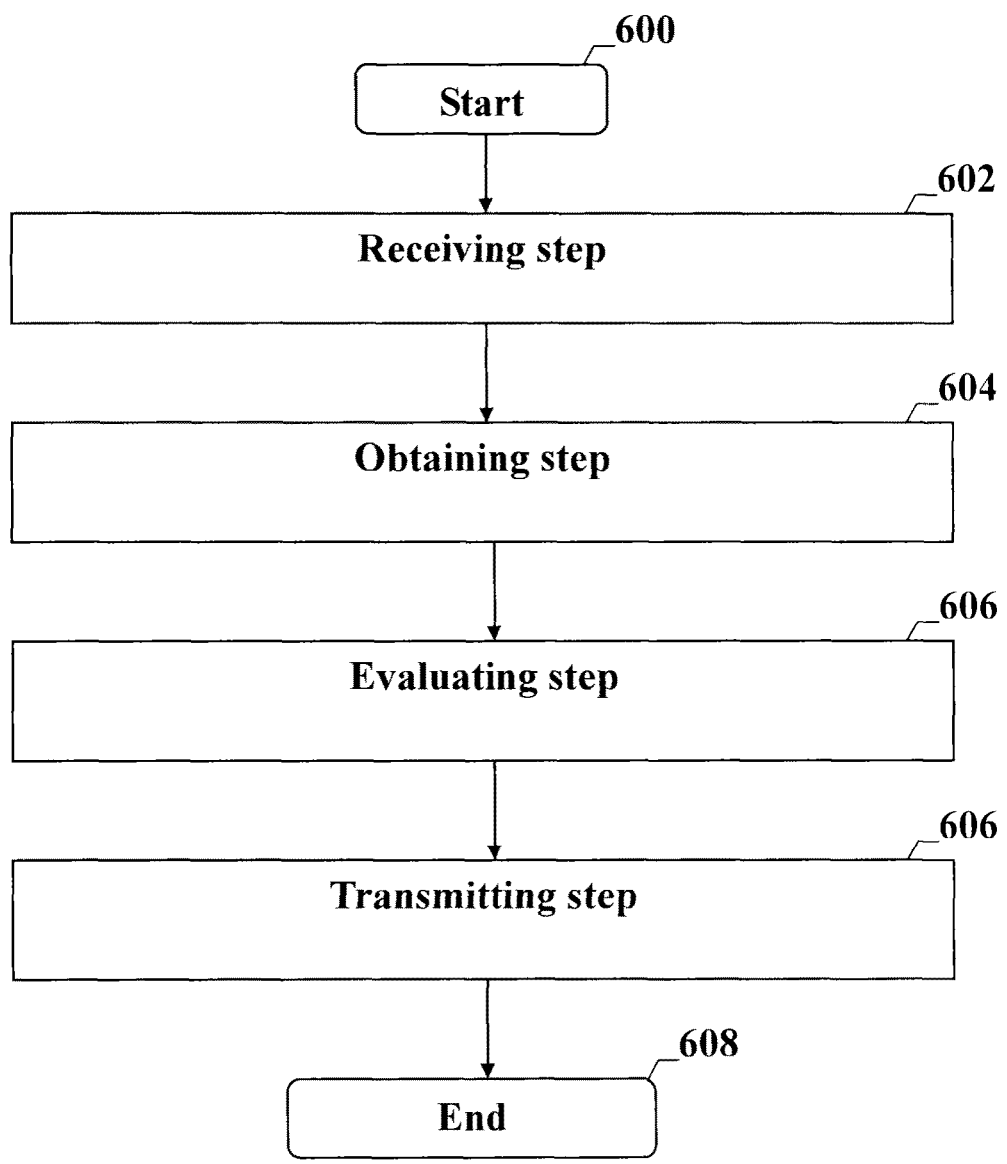
FIG. 6 is a flow chart illustrating a method for use in a wireless communication system according to another embodiment of the invention.

Hereinafter, a method for use in a wireless communication system according to another embodiment of the invention will be described with reference to FIG. 6. FIG. 6 is a flow chart illustrating a method for use in a wireless communication system according to an embodiment of the invention.

As shown in FIG. 6, the method starts from step 600. Following the step 600, the method proceeds to step 602.

The step 602 is a receiving step. In the step 602, an uplink reference signal transmitted by a mobile terminal is received.

Following the step 602, the method proceeds to step 604.

The step 604 is an obtaining step. In the step 604, a signal quality of a mobile terminal with respect to a source cell is obtained according to the uplink reference signal.

Following the step 604, the method proceeds to step 606.

The step 606 is an evaluating step. In the step 606, a variation degree of the signal quality of the mobile terminal with respect to the source cell is evaluated according to a plurality of signal qualities of the mobile terminal with respect to the source cell which are obtained every predetermined period of time.

Following the step 606, the method proceeds to step 608.

The step 608 is a transmitting step. In the step 608, an instruction for triggering the mobile terminal to report a measurement result, to the mobile terminal is transmitted according to the variation degree of the signal quality of the mobile terminal with respect to the source cell.

Lastly, the method ends at step 610.

The method as shown in FIG. 6 is a method corresponding to the device as shown in FIG. 5, and detailed descriptions thereof will not be made repeatedly herein.

Besides, to maintain the compatibility with the conventional standard, a looser switching condition can also be set for the conventional mobile terminal, such that the conventional mobile terminal can enter the state 2 as early as possible and then perform periodical measurement reporting. For example, taking the event A3 as an example, a lower offset A3Offset for the event A3 can be set.

According to the measurement results periodically reported by the mobile terminal, the base station can obtain a signal variation case of the mobile terminal. According to the measurement results periodically reported and the previous switching records, the base station can perform a better switching decision, thereby transmitting a switching instruction to the mobile terminal at appropriate time.

In addition, an embodiment of the present application further proposes a program product, which carries machine-executable instructions. When executing the instructions on an information processing device, the instructions cause the information processing device to implement the method for use in the wireless communication system according to the embodiment of the invention.

In addition, an embodiment of the present application further proposes a storage medium, which comprises machine-readable program code. When executing the program code on an information processing device, the program code causes the information processing device to implement the method for use in the wireless communication system according to the embodiment of the invention.

Correspondingly, a storage medium for carrying the program product storing the machine-readable instruction code is also included in the disclosure of the invention. The storage medium includes but is not limited to a floppy disc, a compact disc, a magnetooptical disc, a storage card, a memory stick and the like.

The device in the wireless communication system according to the embodiment of the invention and constituent components thereof can be configured by means of software, firmware, hardware or combinations thereof. The specific means or manners that can be used for the configuration will not be described repeatedly herein since they are well-known to those skilled in the art. In case of implementation by means of software or firmware, a program constituting the software is installed from a storage medium or network to an information processing device having a specific hardware structure (e.g. the information processing device 700 as shown in FIG. 7), and the computer can implement various functions and so on when being installed with various programs.

Figure 7:
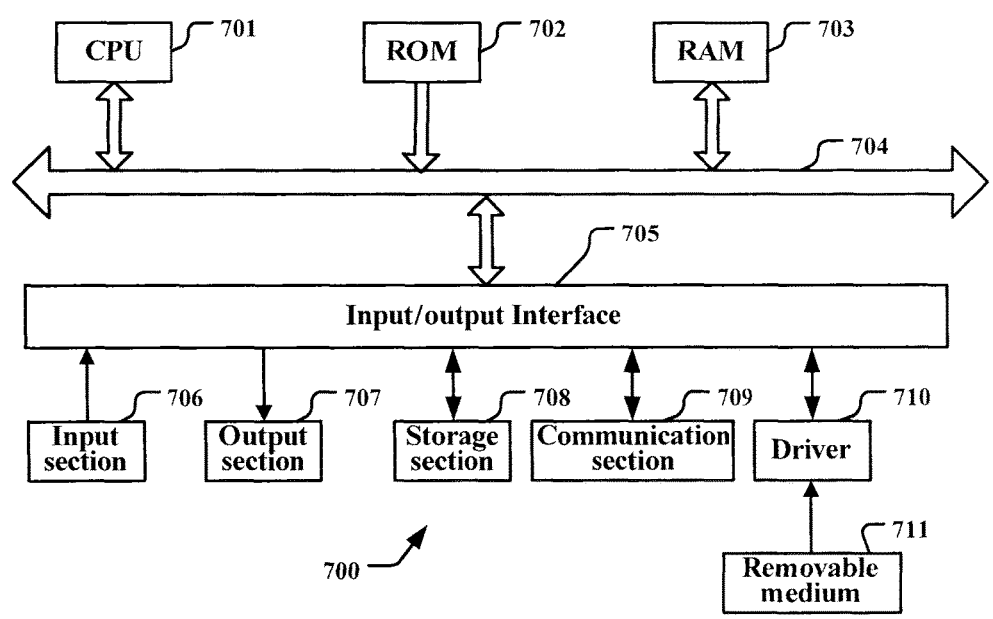
FIG. 7 is a schematic block diagram illustrating an information processing device used for implementing an embodiment according to the invention.

FIG. 7 is a schematic block diagram illustrating an information processing device 700 used for implementing an embodiment according the invention. In FIG. 7, a Central Processing Unit (CPU) 701 performs various processing according to a program stored in a Read-Only Memory (ROM) 702 or a program uploaded from a storage section 708 to a Random Access Memory (ARM) 703. In the RAM 703, data needed when the CPU 701 performs various processing and so on is also stored according to requirements. The CPU 701, the ROM 702 and the RAM 703 are connected to each other via a bus 704. An input/Output interface 705 is also connected to the bus 704.

The following components are connected to the input/output interface 705: an input section 706 (including a keyboard, a mouse, etc.), an output section 707 (including a display such as a Cathode Ray Tube (CRT), a Liquid Crystal Display (LCD) and so on, a loudspeaker, etc.), a storage section 708 (including hard disc, etc.), and a communication section 709 (including a network interface card such as an LAN card, a modem, etc.). The communication section 709 performs communication processing over a network such as the Internet. According to requirements, the driver 710 can also be connected to the input/output interface 705. A removable medium 711 such as a magnetic disc, a compact disc, a magnetooptical disc, a semiconductor memory and so on is installed to a driver 710 according to requirements, such that a computer program read therefrom is installed to the storage section 708 according to requirements.

In a case where the above series of processing is performed by means of software, a program constituting the software is installed from a network such as the Internet or a storage medium such as the removable medium 711.

As should be understood by those skilled in the art, such a storage medium is not limited to the removable medium 711 as shown in FIG. 7 which stores a program and which is distributed separately from a device to provide the program to a user. Examples of the removable medium 711 include a magnetic disc (including a floppy disc (registered trademark)), a compact disc (including a Compact Disc Read-Only-Memory (CD-ROM) and a Digital Versatile Disc (DVD)), a magnetooptical disc (including a Mini Disc (MD) (registered trademark)) and a semiconductor memory. Or, the storage medium may be the ROM 702 and a hard disc and the like included in the the storage section 708, which store programs and are distributed together with devices containing them to users.

When the instruction code is read and executed by a machine, the method for use in the wireless communication system according to the embodiment of the invention can be implemented.

For those ordinarily skilled in the art, numerous amendments and modifications apparently can be made without departing from the scope and the spirit of the invention. The selections and the descriptions for the embodiments aim to better explain the principle and the actual application of the invention, so as to enable those ordinarily skilled in the art to appreciate that the invention can have various embodiments with various alterations which are adapted for desired specific uses.

What is claimed is:

1. A device in a wireless communication system, comprising:
   circuitry configured to
      obtain a signal quality of a mobile terminal with respect to a source cell;
      evaluate, according to a plurality of signal qualities of the mobile terminal with respect to the source cell which are obtained every predetermined period of time, a variation degree of the signal quality of the mobile terminal with respect to the source cell; and
      trigger the mobile terminal, according to the variation degree of the signal quality of the mobile terminal with respect to the source cell, to report a measurement result, wherein
   the predetermined period of time is pre-set or is determined according to a reporting and evaluation period of the measurement result of the mobile terminal, and
   the circuitry is configured to
      determine an offset of the variations of the signal qualities of the mobile terminal with respect to the source cell and a target cell according to configuration parameters of the source cell;
      calculate a signal quality difference between the signal qualities of the mobile terminal with respect to the source cell and the target cell; and
      use a difference between the signal quality difference and the offset as a judgment threshold value for evaluating the variation degree of the signal qualities of the mobile terminal with respect to the source cell and the target cell.

2. The device according to claim 1, wherein the circuitry is configured to judge, according to the signal quality of the mobile terminal with respect to the source cell, whether a signal quality of the mobile terminal with respect to a target cell is obtained.

3. The device according to claim 1, wherein the circuitry is configured to:
   compare a signal quality difference between current signal qualities of the mobile terminal with respect to the source cell and the target cell with the judgment threshold value determined at a previous time;
   update, according to a comparison result, an indicator for indicating the variation degree of the signal qualities of the mobile terminal with respect to the source cell and the target cell; and
   trigger the mobile terminal to report the measurement result when a value of the indicator exceeds a predetermined threshold value.

4. The device according to claim 3, wherein the circuitry is configured to increase the value of the indicator, according to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is greater than or equal to the judgment threshold value determined at the previous time.

5. The device according to claim 3, wherein the circuitry is configured to reduce the value of the indicator or keep the value of the indicator unchanged, according a to a variation amount of the signal quality difference between the current signal qualities of the mobile terminal with respect to the source cell and the target cell and a signal quality difference between previous time of signal qualities of the mobile terminal with respect to the source cell and the target cell, in the case that the signal quality difference between the current signal qualities of the mobile terminal with respect to the source cell and the target cell is less than the judgment threshold value determined at the previous time.

6. The device according to claim 3, wherein the circuitry is configured to reset the indicator or reduce the value of the indicator by a predetermined value in the case that the value of the indicator does not vary within a predetermined period.

7. The device according to claim 3, wherein the circuitry is configured to:
   compare the value of the indicator with a predetermined upper limit value of the indicator; and
   not to increase the value of the indicator any longer when the value of the indicator reaches the upper limit value of the indicator, wherein the upper limit value of the indicator is greater than or equal to the predetermined threshold value.

8. The device according to claim 3, wherein the circuitry is configured to make the mobile terminal stop reporting the measurement result when the value of the indicator is lower than the predetermined threshold value.

9. The device according to claim 1, wherein the circuitry is configured to update the judgment threshold value each time a signal quality difference between the signal qualities of the mobile terminal with respect to the source cell and the target cell is calculated.

10. The device according to claim 9, wherein the circuitry is configured to:
    pre-set a minimum judgment threshold value; and
    when updating the judgment threshold value, set the minimum judgment threshold value as the updated judgment threshold value if the calculated judgment threshold value is less than the minimum judgment threshold value.

11. The device according to claim 10, wherein the circuitry is configured to trigger the mobile terminal to report the measurement result, if it is detected that there are consecutive predetermined number of measurement results less than the minimum judgment threshold value, after the minimum judgment threshold value is set as the updated judgment threshold value.

12. The device according to claim 10, wherein the circuitry is configured to trigger the mobile terminal to report the measurement result, if it is detected that there are more than a predetermined number of measurement results less than the minimum judgment threshold value within the predetermined period of time, after the minimum judgment threshold value is set as the updated judgment threshold value.

13. A method for use in a wireless communication system, comprising:
    obtaining a signal quality of a mobile terminal with respect to a source cell;
    evaluating, according to a plurality of signal qualities of the mobile terminal with respect to the source cell which are obtained every predetermined period of time, a variation degree of the signal quality of the mobile terminal with respect to the source cell; and
    triggering the mobile terminal, according to the variation degree of the signal quality of the mobile terminal with respect to the source cell, to report a measurement result, wherein the predetermined period of time is pre-set or is determined according to a reporting and evaluation period of the measurement result of the mobile terminal and
the method further comprises
   determining an offset of the variations of the signal qualities of the mobile terminal with respect to the source cell and a target cell according to configuration parameters of the source cell;
   calculating a signal quality difference between the signal qualities of the mobile terminal with respect to the source cell and the target cell; and
   using a difference between the signal quality difference and the offset as a judgment threshold value for evaluating the variation degree of the signal qualities of the mobile terminal with respect to the source cell and the target cell.

14. A device in a wireless communication system, comprising:
    circuitry configured to
       receive an uplink reference signal transmitted by a mobile terminal;
       obtain a signal quality of the mobile terminal with respect to a source cell according to the uplink reference signal;
       evaluate, according to a plurality of signal qualities of the mobile terminal with respect to the source cell which are obtained every predetermined period of time, a variation degree of the signal quality of the mobile terminal with respect to the source cell; and
       transmit, according to the variation degree of the signal quality of the mobile terminal with respect to the source cell, an instruction for triggering the mobile terminal to report a measurement result, to the mobile terminal.

15. The device of claim 14, wherein the uplink reference signal is a pilot signal transmitted by the mobile terminal.

16. The device of claim 15, wherein the circuitry is configured to obtain a signal quality of a downlink channel with respect to the source cell according to the uplink reference signal.

17. The device of claim 14, wherein the uplink reference signal is a Sounding Reference Signal (SRS) pilot signal.

18. A method in a wireless communication system, comprising:
    receiving an uplink reference signal transmitted by a mobile terminal;
    obtaining a signal quality of the mobile terminal with respect to a source cell according to the uplink reference signal;
    evaluating, according to a plurality of signal qualities of the mobile terminal with respect to the source cell which are obtained every predetermined period of time, a variation degree of the signal quality of the mobile terminal with respect to the source cell; and
    transmitting, according to the variation degree of the signal quality of the mobile terminal with respect to the source cell, an instruction for triggering the mobile terminal to report a measurement result, to the mobile terminal.

19. A device in a wireless communication system, comprising a memory and a processor, wherein, the storage stores computer instructions, the processor is used for performing the computer instructions stored in the memory to implement a method according to claim 18.

* * * * *